United States Patent [19]
Peterson

[11] Patent Number: 5,123,704
[45] Date of Patent: Jun. 23, 1992

[54] HEADREST

[76] Inventor: Carl W. Peterson, 1814 Fairfax La., Carrollton, Tex. 75006

[21] Appl. No.: 551,152

[22] Filed: Jul. 11, 1990

[51] Int. Cl.$^5$ .............................. A47C 7/38; A47C 1/10
[52] U.S. Cl. ..................................... 297/395; 297/391
[58] Field of Search ................... 297/391, 395; 5/481, 5/434, 53.1, 440, 437

[56] References Cited

U.S. PATENT DOCUMENTS

| 4,059,306 | 11/1977 | Harder, Jr. | 297/218 |
| 4,166,459 | 9/1979 | Nightingol | 5/440 |
| 4,607,886 | 8/1986 | Mazhar | 297/395 |
| 4,744,601 | 5/1988 | Nakanishi | 297/391 |
| 4,771,493 | 9/1988 | Park | 5/440 |
| 4,828,287 | 5/1989 | Siler | 297/395 |
| 4,838,575 | 6/1989 | Livingston | 297/395 |
| 4,880,275 | 11/1989 | Lanteri | 297/395 |
| 4,919,483 | 4/1990 | Horkey | 297/395 |

Primary Examiner—Kenneth J. Dorner
Assistant Examiner—Cassandro Hope
Attorney, Agent, or Firm—Morgan L. Crow

[57] ABSTRACT

A headrest suitable to be mounted on a vertical surface such as a rear window for vehicles is disclosed. At least one layer of plastically deformable material and at least one layer of resilient material is used to provide energy absorptive protection for the vehicle occupant's head. Vertical position adjustment may be provided on a transparent backing plate. Various signals and insignia may be inscribed on the side of the backing plate mounted toward a window.

4 Claims, 1 Drawing Sheet

HEADREST

BACKGROUND OF THE INVENTION

This invention relates to headrests for cab type vehicles such as pickup trucks, large trucks, semi-trailer tractors, some recreational vehicles and the like. Many such vehicles are not provided with headrests which would cushion the head of vehicle occupants in case of an impact on the truck which would cause a backward rearwardly directed momentum force on the occupant's head which would cause the occupant's head to impact on the rear window, or cause a whip-lash neck injury, or both. Such an impact and injury could occur in many circumstances, but, for example, a vehicle being struck from behind could cause the hazard just described. A significant hazard is the uncushioned impact of a person's head against the rear window glass. If the glass does not break, the hard surface can cause injury to the person's head. If the glass does break, there is the added hazard of cutting from the broken glass.

One problem with such headrests is the lack of room in which to mount such a headrest. Another problem is that such headrests obstruct the view of the occupants of the vehicle. Another problem is that such headrests are made of resilient materials.

Injuries to a vehicle occupant's head as described above are due to the person's head striking a hard surface. The inertia of a person's head can be measured in foot-pounds of energy at the relative velocity of the person's head with respect to the surface which impacts on the head. The critical relative velocity measurement is important, irrespective of whether the head or the surface is moving or stationary. The critical property of the cushion is that the energy of inertia be absorbed, and not be redelivered after the impact. Resilient materials by definition are elastic, and rebound with a measurable portion of the absorbed energy after the force of the impact by elastically recovering their original shape. Desirably, a headrest cushion should not be resilient (elastic) because greater injuries are probable if a persons head strikes a resilient cushion, then is bounced away, causing a greater impact than necessary than if the cushion were not resilient. Desirably a headrest cushion should deform plastically, not elastically. Plastic deformation is that deformation which is not recovered or regained after impact. Energy absorbed by plastic deformation is not rebounded and in case of a headrest will not bounce or redeliver the energy to a person's head after an impact. One advantage of the present invention is that the cushion effect distributes the impact forces over a much larger area of the person's head and over a larger area of the window glass. These for distributions reduce the contact pressure between the person's head and the window, resulting in greatly reduced injuries and reduced likelihood of breakage of the window glass.

M.S. Mazhar U.S. Pat. No. 4,607,886 discloses a truck headrest which adjustably attaches to the truck seat and provides small pads which are supported against the rear window.

D.R. Alexander U.S. Pat. No. 4,807,933 discloses a headrest which includes a unitary resilient body which extends from the seat above the window and is supported by the window frame above and below the window.

J.R. Perserfield U.S. Pat. No. 4,770,466 discloses a headrest including recessed suction cups for detachably attaching a resilient headrest to a support surface such as a rear window.

These and other attempts to provide a headrest for cab type vehicles have not provided a headrest which solves the problems listed above.

SUMMARY OF THE INVENTION

A headrest for attachment to an upright support surface such as a rear window in a truck including a backing plate, a resilient cushion layer engageable with the backing plate, and a non-elastically deformable energy absorbing layer engageable with the resilient layer. Decorative signs or insignia may be applied to the backing plate.

DESCRIPTION OF THE PREFERRED EMBODIMENT

Figure 1:
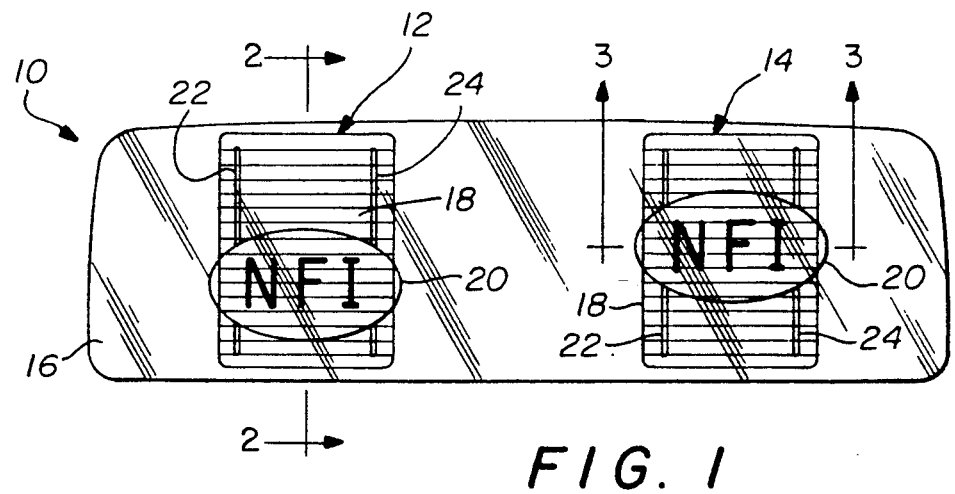
FIG. 1 is an elevation view of the preferred embodiment of the present invention.

FIG. 1 is a rear elevation view of a rear window shown generally at 10, of a cab type vehicle, as for example, a pickup truck. Two head rests according to the present invention are illustrated attached to a vehicle window at 12 and 14 positioned to provide headrest protection for 2 occupants of the vehicle, i.e., a driver and a passenger. The head rests 12 and 14 are affixed to the window glass 16. The headrest 12 comprises a backing plate 18, a headrest cushion assembly 20, and guides 22 and 24 to which the cushion 20 is attached in a manner to be described more completely hereinafter. The cushion 20 is desirably a round or oval shape to avoid obstruction of the driver's view through the rear window.

Guides 22 and 24 are formed of round rods and are attached to the backing plate 18, which is clear plastic material so as to not obstruct the view. The cushion 20 is mounted on the guides 22 and 24 with friction attachments, not shown, in a manner well known in the industry to provide vertical position adjustment of the cushion 20 to provide protection in the proper position for the physical size of the occupant so that the occupant's head will impact on cushion 20 in case of another vehicle approaching from the rear and hitting the vehicle equipped with my invention.

The clear plastic backing plate 18 can be imprinted with suitable insignia such as a representation such as a football field, with a cushion 20 in an oval shape representative of a football and may be imprinted to represent a football and with the name or logotype of a football team or league. Alternatively, the clear plastic backing plate can be imprinted to represent a basketball court, and the cushion 20 can be round and imprinted to represent a basketball and be imprinted with the name or logotype of a basketball team or league. The backing plate 18 can represent any kind of a playing field or court, and the cushion 20 can represent any kind of a ball or playing piece. Signage on the backing plate can be advertising, or some other kind of message desired by the owner. The headrest 12 may be attached to the window by glue, suction cups, double sided tape, or other means well known in the industry.

Figures 2, 3, 4:
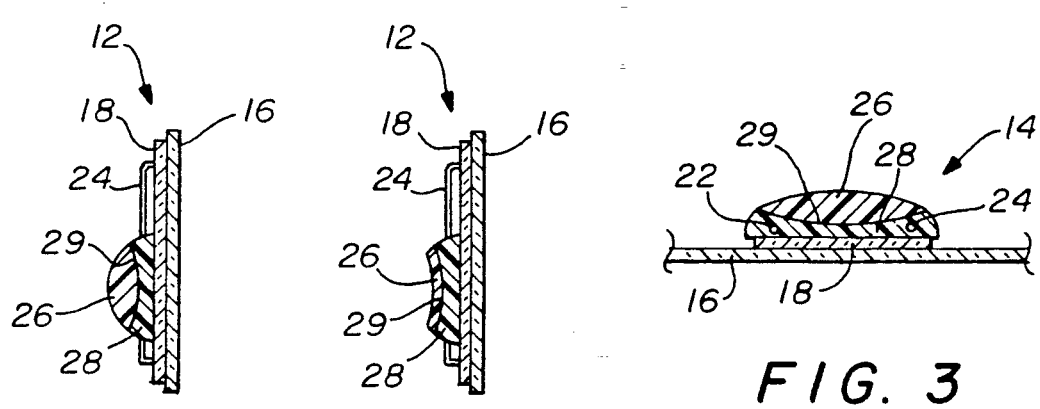
FIG. 2 is a cross section elevation view of FIG. 1.
FIG. 3 is a plan view section of FIG. 2.
FIG. 4 is a view of FIG. 2 after impact of a person's head.

Referring now to FIG. 2, the cushion 20 desirably comprises a non-elastic cushion portion 26, and preferably be attached to an elastic portion 28. The major portion 26 of the cushion 20 should have plastically deformable, that is non-elastic properties. Such properties will absorb energy in an impact and will not rebound or recover the original shape, the energy of impact will be absorbed to protect the occupant's head. Such energy absorption properties reduces the pressure of impact on the occupant's head, reducing the probability of injury.

Resilient cushion 28 has a concave side 29 facing toward the occupant's head. The orientation of the concave side is then on the opposite side of the resilient cushion 28 from the backing plate 18. Non-elastic cushion 26 preferably, although not necessarily, has a shape which is form fitting to the concave side of the resilient cushion 28. Non-elastic cushion 26 preferably, although not necessarily, is attached to the concave side of the resilient cushion 28.

FIG. 3 is a horizontal cross section of FIG. 2 looking downwardly, illustrating the plan cross section shape of the preferred embodiment.

FIG. 4 is an illustration of the headrest of FIG. 2 after impact, showing the crushing of the non-resilient portion 26, and the recovered shape of the resilient portion 28 of cushion 20. Since the elastic portion 28 is of a thicker dimension at the outer edges and of a lesser dimension in the center area, the thicker edges will tend to direct the driver's head toward the center of the headrest in case the driver's head impacts the headrest. Such a force vector will reduce the likelihood of the driver's head hitting the edge of the steering wheel or the side window. Increased safety will result from such improved control in the direction a driver's head will be deflected in a collision.

Figure 5:
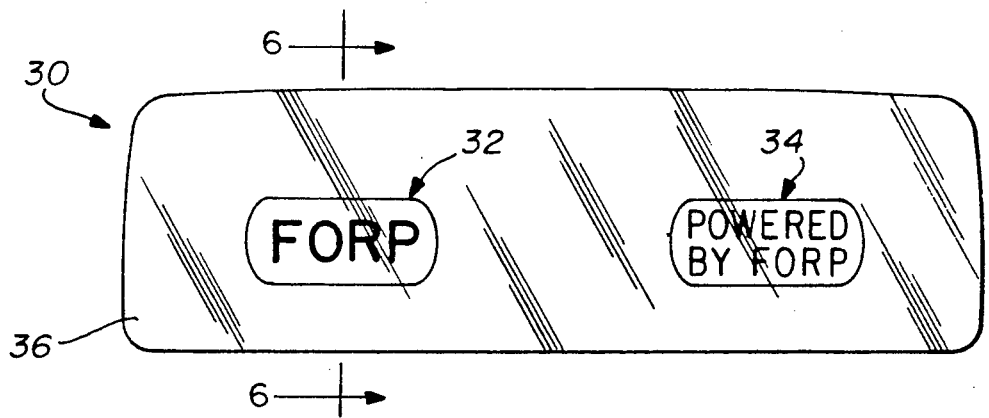
FIG. 5 is an elevation of an alternative embodiment of the present invention.

FIG. 5 is a rear elevation view of a rear window shown generally at 10, of a cab type vehicle, as for example, a pickup truck. Two head rests of alternative embodiments of the present invention are illustrated attached to a vehicle window at 32 and 34 positioned to provide headrest protection for 2 occupants of the vehicle, i.e., a driver and a passenger. The head rests 32 and 34 are affixed to the window glass 36.

The illustrated headrests 32 and 34 may be imprinted with any kind of message or advertising as illustrated in FIG. 5. The decorative nature of my invention is also an important factor in the encouragement of drivers to utilize the headrest and thereby achieve improved safety by use of my invention.

Figure 6:
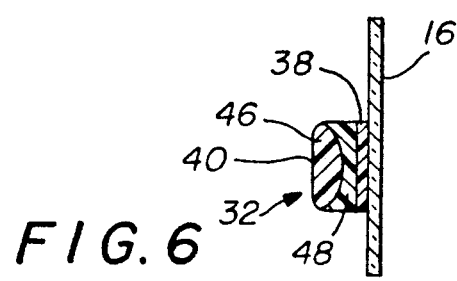
FIG. 6 is a cross section elevation view of FIG. 4.

Referring now to FIG. 6, a backing plate 38 may be formed of opaque plastic. The cushion 40 is comprised of a non-elastic (non-resilient) portion 46, and a much smaller resilient portion 48. The headrest 32 may be attached to the window by glue, suction cups, double sided tape, or other means well known in the industry. The portion 46 is non-elastic for the energy absorptive and non-rebounding properties described hereinbefore.

Although only two embodiments of my invention have been illustrated in the accompanying drawings and described in the foregoing Descriptions, it will be understood that the invention is not limited to the embodiments disclosed, but is capable of numerous rearrangements, modifications, and substitutions of parts and elements without departing from the spirit of the invention.

I claim:

1. A headrest for attachment to a vertical window or vertical support surface in a vehicle comprising:
   a transparent backing plate, having a first side and a second side,
   means for attaching the second side of transparent backing plate to the vertical window or support surface of a vehicle,
   a resilient cushion having a first side and a second side, whereby the first side of the resilient cushion is attached to the first side of the transparent backing plate,
   a non-elastic deformable cushion attached to the second side of the resilient cushion, and
   means for vertically adjusting the position of the resilient cushion with respect to the first side of the transparent backing plate.

2. A headrest according to claim 1 having insignia inscribed on the second side of the backing plate.

3. A headrest according to claim 1 having signage inscribed on the second side of the backing plate.

4. A headrest according to claim 1 wherein the resilient cushion has a first side which in engagable with the first side of the backing plate, and a second side which is concave.

* * * * *